United States Patent [19]

Kubota et al.

[11] 4,132,350
[45] Jan. 2, 1979

[54] MAGNETIC CARD

[75] Inventors: Tetsuo Kubota, Tachikawa; Atsumi Noshiro, Chiba; Norimoto Suzuki, Tokyo, all of Japan

[73] Assignee: Dai Nippon Insatsu Kabushiki Kaisha, Tokyo, Japan

[21] Appl. No.: 853,273

[22] Filed: Nov. 21, 1977

[30] Foreign Application Priority Data

Nov. 24, 1976 [JP] Japan .................. 51-140926

[51] Int. Cl.$^2$ ............................................. G06K 19/06
[52] U.S. Cl. .................... 235/493; 235/488; 360/2
[58] Field of Search ............ 235/493, 488; 360/2; 428/900

[56] References Cited

U.S. PATENT DOCUMENTS

| Re. 25,998 | 3/1966 | Silverschotz | 235/493 |
| 3,245,697 | 4/1966 | Nugent | 235/493 |
| 3,946,206 | 3/1976 | Darjany | 235/493 |
| 4,044,231 | 8/1977 | Beck et al. | 235/493 |
| 4,058,839 | 11/1977 | Darjany | 235/493 |

*Primary Examiner*—Daryl W. Cook
*Attorney, Agent, or Firm*—Kenyon & Kenyon, Reilly, Carr & Chapin

[57] ABSTRACT

A magnetic card comprises (1) a planar substrate having at least a surface layer of a thermoplastic resin, (2) a magnetic layer disposed at at least one part of a surface of the planar substrate, (3) a color layer disposed on the magnetic layer, and (4) a pattern layer disposed on the color layer.

In this magnetic card, the color of the magnetic layer which does not contribute to an attractive appearance is hidden under the color layer, and, because the pattern layer is disposed on the color layer, the pattern is not restricted by the color of the magnetic layer and appears clear due to the presence of the color layer. Accordingly, this magnetic card can be produced with an improved appearance from the viewpoint of design.

23 Claims, 23 Drawing Figures

MAGNETIC CARD

BACKGROUND OF THE INVENTION

The present invention relates to a magnetic card adaptable for use in the form of various identification cards such as credit cards, bank cards, and visas.

A magnetic card of this type typically comprises a core sheet of, for example, an opaque synthetic resin such as polyvinyl chloride coated with a transparent over sheet of a similar synthetic resin such as polyvinyl chloride, and a magnetic layer for memory storage of necessary information. This magnetic layer is ordinarily disposed on the over sheet and a pattern is printed on the core sheet.

Thus, the magnetic layer and the pattern are ordinarily provided independently of each other in a prior art magnetic card. For this reason, a magnetic card cannot be produced with an improved appearance from the viewpoint of aesthetic design according to the prior art because a magnetic layer, being disposed on the over sheet, unavoidably can be seen from the outside and also hides the pattern and moreover the magnetic layer of a magnetic card is limited in the selection of its color (brown or dark brown in most cases).

SUMMARY OF THE INVENTION

An object of the present invention is to provide a magnetic card of improved appearance. More particularly, by providing a color layer over a magnetic layer to hide the color of the magnetic layer and placing a pattern layer on the color layer, the present invention is aimed at providing a magnetic card of improved appearance with a pattern which is not limited by the color of the magnetic layer and appears clear because of the presence of the color layer.

The magnetic card according to the present invention comprises (1) a planar substrate having at least a surface layer of thermoplastic resin, (2) a magnetic layer disposed at at least one part of a surface of the substrate, (3) a color layer disposed on the magnetic layer, and (4) a pattern layer disposed on the color layer.

The present invention is thus based on the discovery that a magnetic card having a magnetic layer and possessing satisfactory magnetic characteristics from the practical viewpoint can be obtained even if a color layer and a pattern layer are disposed on the magnetic layer.

Another object of the present invention is to provide a process for producing a magnetic card of the above stated character.

This magnetic card is produced, for example, by the following three processes.

The first process comprises (1) disposing successively at at least one part of a first over sheet a magnetic layer comprising a magnetic material powder and a binder of a natural or synthetic resin, a color layer, a pattern layer, and a protective resin layer to obtain a first laminate, and (2) providing a second over sheet, sandwiching a pair of core sheets between the second over sheet and the first over sheet of the first laminate, and heating under pressure the entire structure thus prepared to obtain a magnetic card.

The second process comprises (1) disposing successively at at least one part of a planar support a protective resin layer, a pattern layer, a color layer, and a magnetic layer comprising a magnetic material powder and a binder of a thermoplastic resin to obtain a first laminate, (2) placing the magnetic layer of the first laminate in contact with a first over sheet of a thermoplastic resin, bonding the first laminate to the first over sheet by heating under pressure, and peeling off the planar support from the bonded structure thus obtained to leave a second laminate, and (3) providing a second over sheet, sandwiching a pair of core sheets between the second over sheet and the first over sheet of the second laminate, and heating under pressure the entire structure thus prepared to obtain a magnetic card.

The third process comprises (1) disposing successively at at least one part of a planar support a protective resin layer, a pattern layer, and a color layer to obtain a first laminate, (2) disposing at at least one part of a first over sheet of a thermoplastic resin a magnetic layer comprising a magnetic material powder and a binder of a thermoplastic resin to obtain a second laminate, and (3) providing a second over sheet and a pair of core sheets, disposing successively in laminated state the second over sheet, the pair of core sheets, the second laminate, and the first laminate in the order named, the first over sheet of the second laminate being placed in contact with one of the core sheets, the magnetic layer of the second laminate being placed in conact with the color layer of the first laminate, and heating under pressure the entire structure thus prepared to obtain a bonded structure, and (4) peeling off the planar support from the bonded structure thus prepared to obtain a magnetic card.

The nature, principle, and utility of the present invention will be more clearly understood from the following detailed description when read in conjunction with the accompanying drawings wherein like parts are represented by like reference numerals.

DETAILED DESCRIPTION

Figure 1:
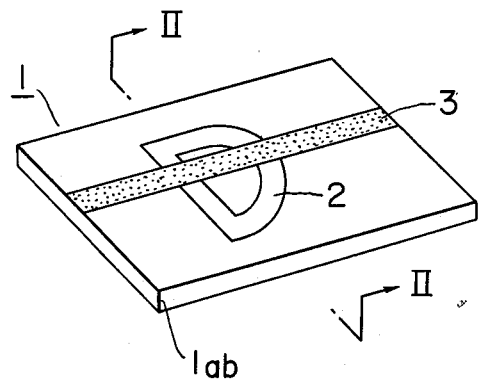
FIG. 1 is a perspective view of a prior art magnetic card.
Figure 2:
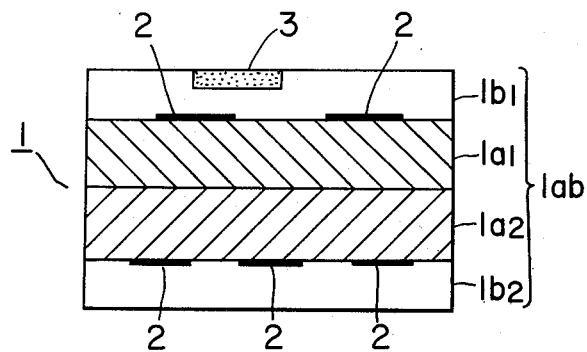
FIG. 2 is a sectional view thereof.

FIG. 1 is a perspective view of one example of the most typical prior art magnetic card, and FIG. 2 is a sectional view taken along the line II—II in FIG. 1. As shown in these figures, this magnetic card 1 is fabricated by bonding together a pair of white core sheets $1a_1$ and $1a_2$ respectively of polyvinyl chloride of 0.28-mm thickness, printing a pattern 2 on each of the outer surfaces of the core sheets thus bonded, and providing a strip of magnetic layer 3 on an over sheet $1b_1$ which forms a surface of a substrate $1_{ab}$ comprising the core sheets $1a_1$ and $1a_2$, and transparent over sheets $1b_1$ and $1b_2$ respectively of polyvinyl chloride of 0.10-mm thickness bonded thereonto. In this magnetic card, the pattern 2 is partly hidden under the magnetic layer 3.

Figure 3:
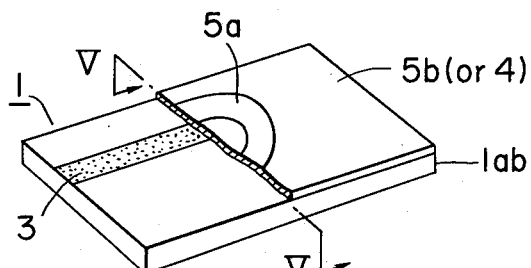
FIG. 3 and 4 are perspective views, partly cut away, respectively showing two examples of the magnetic card according to the present invention.
Figure 4:
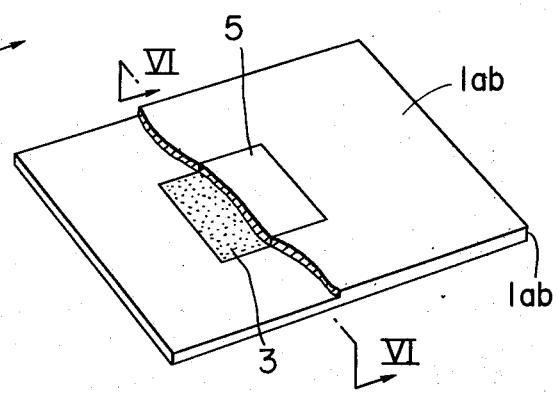
Figure 5:
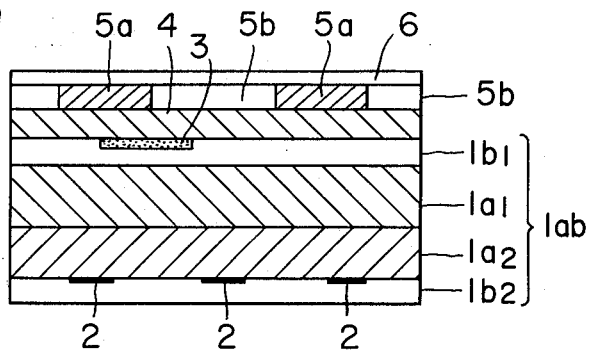
FIGS. 5 and 6 are sectional views respectively of the magnetic cards illustrated in FIGS. 3 and 4.
Figure 6:
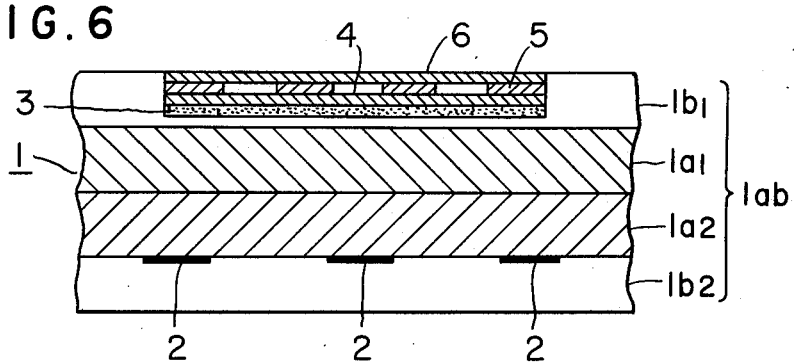

FIGS. 3 and 4 are perspective views, partly cut away to expose the interior, of two examples of the magnetic card according to the present invention, and FIGS. 5 and 6 are sectional views respectively taken along the line V—V in FIGS. 3 and the line VI—VI in FIG. 4.

Referring now to FIGS. 3 and 5, the magnetic card 1 is fabricated by embedding a magnetic layer 3 at at least a part of a substrate $1_{ab}$, and disposing successively a color layer 4, a pattern layer 5, and a protective resin layer 6 on the entire surface of the substrate $1_{ab}$ including the magnetic layer 3 embedded therein. The substrate $1_{ab}$ in this example has a laminar structure formed by sandwiching a pair of core sheets $1a_1$ and $1a_2$ between a pair of over sheets $1b_1$ and $1b_2$, and integrating the sandwiched structure by bonding. The substrate $1_{ab}$ may also have a monolayer structure instead of a laminar structure.

The core sheets $1a_1$ and $1a_2$ may be made of any material that is opaque and has a shape retaining property such as paper, metals, natural resins, and synthetic resins, preferably natural resins and synthetic resins. A thermoplastic resin such as polyvinyl chloride blended with a pigment such as $TiO_2$ is ordinarily used for the core sheets. In the above example, a pattern 2 is printed on the core sheet forming the back side of the card with printing inks as in a prior art magnetic card, which pattern may, of course, be omitted.

The over sheets $1b_1$ and $1b;hd 2$ are made of a thermoplastic resin such as polyvinyl chloride, ordinarily a transparent resin. As will be apparent from the foregoing, at least the surface layer of the substrate $1_{ab}$ is made of a thermoplastic resin. The thickness of the substrate is determined by that of the core sheets $1a_1$ and $1a_2$, each being, for example, 0.28 mm, and that of the over sheets $1b_1$ and $1b_2$, each being, for example, 0.1 mm. A wide range of thicknesses can be employed depending upon the use of the magnetic card. It is also apparent that the number of the core sheet is variable depending upon the thickness of the substrate $1_{ab}$.

The magnetic layer 3 is formed by dispersing a magnetic material such as a magnetic iron oxide, for example, $\gamma$-$Fe_2O_3$ and $Fe_3O_4$, chromium oxide or Fe-Co-Ni alloys in powder form in a binder containing as a principal constituent any natural or synthetic resin such as a vinyl chloride/vinyl acetate copolymer or a vinyl chloride/vinylidene chloride copolymer. The thickness of the magnetic layer thus made ranges, for example, from about 5 to 20 $\mu$m.

The color layer 4 is formed, for example, by dispersing or dissolving a dye or pigment, preferably a pigment, of a desired color and high hiding power in a binder principally comprising any natural or synthetic resin such as a polyamide resin, a cellulose resin, melamine resin, a vinyl chloride/vinyl acetate copolymer a polyurethane resin, an acrylic resin or a maleic acid resin. Preferred examples of pigments are titanium dioxide and zinc oxide. These pigments are used in a quantity of, for example, from about 100 to 150 parts by weight per 100 parts by weight of the binder. The color layer per se can have a laminar structure comprising a plurality of color layers, and the total thickness thereof is, for example, from 2 to 15 $\mu$m, preferably from 5 to 10 $\mu$m.

The pattern layer 5 is prepared, for example, by dispersing or dissolving a dye or pigment of a desired color tone in a binder principally comprising any of the natural and synthetic resins mentioned above in regard to the color layer 4. There may be either a case wherein a pattern portion 5a is provided on the color layer 4, and a non-pattern portion 5b is provided in the remaining area to form a single pattern layer as shown in FIG. 5, or a case wherein no non-pattern portion 5b is provided and, instead, the color layer 4 remains exposed. Further, the pattern portion 5a may be of a plurality of colors. The thickness of the pattern layer 5 is, for example, from about 1 to 10 $\mu$m at the pattern portion 5a. The pattern layer 5, particularly the pattern portion 5a, per se is substantially identical to the prior art print pattern 2 and the pattern 2 which may sometimes be provided on the core sheet forming the back side of the magnetic card of the present invention, and forms letters, marks, ground tints or the like.

The protective resin layer 6 is preferable for the purpose of increasing the durability of the pattern layer 5 and the color layer 4 as well as imparting a smoother surface to the card, but is not indispensable for achieving the objects of the present invention. The protective layer 6 is formed of any natural or synthetic resin having transparency and a film forming property such as an acrylic resin and a mixture of melamine resin and an unsaturated polyester resin. The thickness of the protective layer is from 0.5 to 3$\mu$m, preferably from 0.5 to 1 $\mu$m.

The total thickness of the color layer 4, the pattern layer 5 and the protective resin layer 6 thus disposed on the magnetic layer 3 is, for example, from about 3.5 to 28 $\mu$m, preferably from 6 to 15 $\mu$m.

FIGS. 4 and 6 show an example of the magnetic card wherein the color layer 4, the pattern layer 5 and the protective resin layer 6 are disposed only at the portion where the magnetic layer 3 is provided, and all these layers are embedded in the over sheet $1b_1$ so that the surface of the protective layer 6 will lie in the same plane as the surface of the substrate $1_{ab}$ at the portion where the magnetic layer 3 is not provided. The other structure of this example is not substantially different from the structure of the example shown in FIGS. 3 and 5. Owing to this structure, the location of the magnetic layer 3 can readily be detected from the outside while the layer 3 per se is hidden, and trouble such as excessive wear of the magnetic head or magnetic card can be avoided because the outermost layer (the protective layer 6 in this example) at the portion where the magnetic layer 3 and other layers are provided lies in the same plane as the surface of the magnetic card.

The magnetic layer 3, although provided at one portion of the substrate $1_{ab}$ in the examples described above, can be provided, if desired, at two or more portions, and the magnetic materials are also variable according to the location of the magnetic layers.

Figure 7:
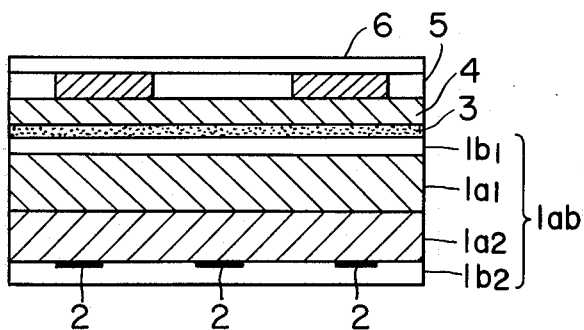
FIG. 7 is a sectional view of another example of the magnetic card according to the present invention.

FIG. 7 is a sectional view showing another example of the magnetic card according to the present invention which is the same as the example shown in FIG. 5 except that the magnetic layer 3 is provided over the entire surface of the substrate $1_{ab}$. This example is particularly suitable for recording a large quantity of information.

The magnetic card of the present invention as set forth hereinabove can be fabricated by the following processes for producing a magnetic card including a step of heating under pressure, which step can be successfully carried out since at least the surface layer of the substrate $1_{ab}$ is made of a thermoplastic resin.

FIGS. 8 through 12 are sectional views respectively showing intermediate stages in the above stated first process for producing the magnetic card shown in FIGS. 4 and 6. As shown in these figures, the magnetic layer 3, the color layer 4, the pattern layer 5, and the protective resin layer 6 are successively disposed on the over sheet $1b_1$ which is to form the surface layer of the magnetic card. The disposition of these layers comprises, for example, preparing a paint or ink by dissolving or dispersing the aforesaid resins constituting these layers and other ingredients in a suitable liquid medium, and applying or printing successively the paint or ink thus prepared on the over sheet by a coating method such as the bar coating or roller coating method or the gravure printing method. More particularly, the magnetic layer 3 is advantageously provided by a coating method and the other layers are advantageously provided by the gravure printing method. The gravure printing is carried out, for example, under the following conditions. The color layer 4 is printed at a depth of ink retaining cell (hereinafter referred to as "cell depth") of from 40 to 50 $\mu$, if desired, several times with a plurality of color inks. The pattern 5 is printed at a cell depth of 25 $\mu$, and the protective resin layer 6 is printed at a cell depth of 20$\mu$.

Figure 8:
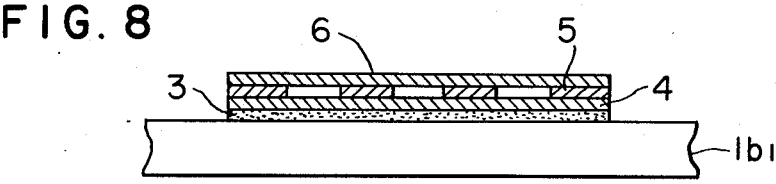
FIGS. 8 through 18 are sectional views respectively indicating intermediate steps in the fabrication of the magnetic card according to the present invention.
Figure 9:
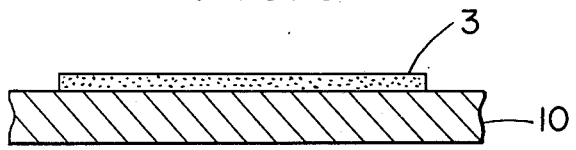
Figure 10:
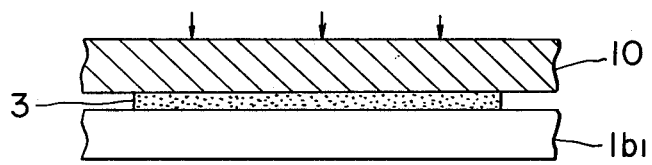
Figure 11:

Alternatively, a laminate as shown in FIG. 8 is obtained by a process comprising the heat transferring method as shown in FIGS. 9 through 11. On a planar support 10, for example, of a film of polyethylene terephthalate, the magnetic layer 3 comprising a magnetic material powder and a thermoplastic resin having high releasability with respect to the planar support, such as a vinyl chloride/vinyl acetate copolymer, is once deposited, for example, by a coating method. The planar support on which the heat transferable magnetic layer 3 has been provided is placed in contact with the over sheet $1b_1$ in such a manner that the magnetic layer 3 is placed adjacent to the over sheet $1b_1$ and thus maintained, for example, at 100° to 150° C. under a pressure of 10 to 100 Kg/cm$^2$ for 2 seconds to 10 minutes to cause the magnetic layer 3 to adhere to the sheet $1b_1$. Then, by peeling off the planar support 10, the magnetic layer 3 is provided on the sheet $1b_1$ as illustrated in FIG. 11. Subsequently, the color layer 4, the pattern layer 5, and the protective resin layer 6 are provided on the magnetic layer 3, for example, by printing as set forth above, whereupon the laminate shown in FIG. 8 is obtained.

This process for producing a laminate which includes the heat transferring method is effectively employed to obtain a magnetic layer of a uniform thickness.

Figure 12:
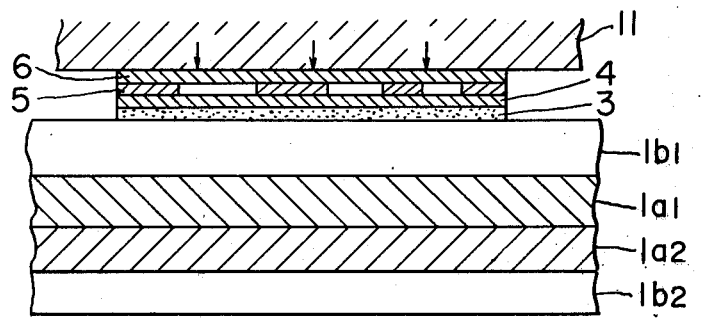

By sandwiching a pair of core sheets $1a_1$ and $1a_2$ which may be bonded to each other with a conventional adhesive agent, if necessary, between the over sheet $1b_1$ of the laminate shown in FIG. 8 and a separately prepared over sheet $1b_2$ as illustrated in FIG. 12, integrating the sandwiched structure by heating under pressure with a hot press head 11, and cutting the core sheets $1a_1$ and $1a_2$ and the over sheets $1b_1$ and $1b_2$ to a desired size, the magnetic card shown in FIGS. 4 and 6 is obtained. In this process, the thermoplastic resin constituting the over sheet $1b_1$ is softened by the heating under pressure, and, all of the magnetic layer 3 through the protective resin layer 6 are embedded in the over sheet $1b_1$, so that the surface of the protective resin layer 6 will lie in the same plane as the surface of the over sheet $1b_1$.

Typical conditions employed in this hot pressing step include a temperature of 150° C., a pressure of 25 Kg/cm$^2$ and a period of 15 minutes in the case where the over sheet $1b_1$ is made of polyvinyl chloride. However, the hot pressing is similarly applicable when another resin is used for the over sheet by suitably selecting the conditions, depending upon the softening point of the resin, within the ranges of from 100° to 200° C., from 15 to 35 Kg/cm$^2$ and from 5 to 25 minutes.

Figure 13:
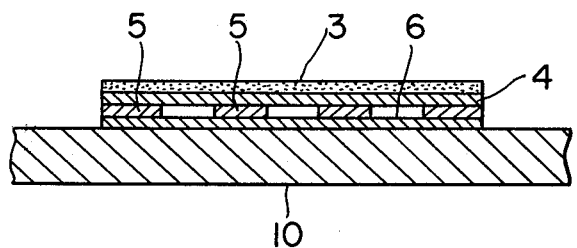
Figure 14:
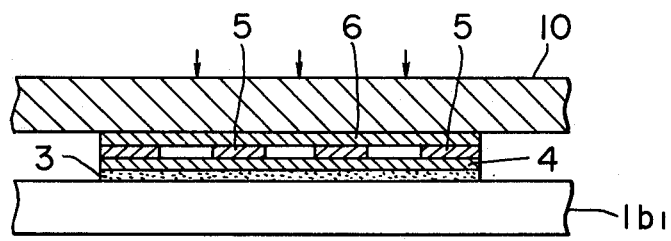

FIGS. 13 and 14 are sectional views respectively showing intermediate stages in the second process for producing the magnetic card shown in FIGS. 4 and 6. The protective resin layer 6, the pattern layer 5, the color layer 4, and the magnetic layer 3 are successively placed on the planar support 10, for example, of a film of polyethylene terephthalate to obtain a first laminate. This step of laminating the layers is substantially the same as the step of disposing the layers on the over sheet $1b_1$ in FIG. 8 except that the order of disposition of the respective layers is reversed. The magnetic layer 3 obtained is herein constituted as a heat transferable magnetic layer as mentioned with reference to FIG. 9.

Subsequently, the magnetic layer 3 of the first laminate is placed in contact with the over sheet $1b_1$ as illustrated in FIG. 14, and bonded thereto by heating under pressure. The planar support 10 is then peeled off from the bonded structure to leave a second laminate. This heat transferring is substantially the same as that described in connection with the first process with reference to FIG. 10.

A pair of core sheets $1a_1$ and $1a_2$ is sandwiched between the over sheet $1b_1$ of the second laminate thus obtained and a separately prepared over sheet $1b_2$, and the entire structure is integrated by hot pressing. This hot pressing is similar to that described in the first process with reference to FIG. 12. By cutting the core sheets $1a_1$ and $1a_2$ and the over sheets $1b_1$ and $1b_2$ out of the integrated structure thus obtained to a desired size, the magnetic card shown in FIGS. 4 and 6 is obtained.

The planar support 10 may be peeled off immediately after the step of heating under pressure shown in FIG. 14 or, instead, after the final hot pressing step.

The first and second processes are set forth above in relation to the production of the magnetic card illustrated in FIGS. 4 and 6. It will be apparent, however, that the magnetic card shown in FIGS. 3 and 5 can be obtained by providing the color layer 4, the pattern layer 5, and the protective layer 6 in a larger area, i.e., over the entire surface of the substrate $1_{ab}$ of the end magnetic card, and further that the magnetic card shown in FIG. 7 can be obtained by providing also the magnetic layer 3 over the entire surface of the substrate $1_{ab}$.

Next, the third process which is a compromise between the first and second processes will be described with reference to FIGS. 15 through 17 in relation to the magnetic card shown in FIGS. 3 and 5.

Figure 15:
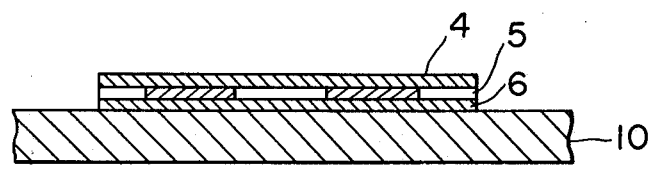

As illustrated in FIG. 15, the protective resin layer 6, the pattern layer 5, and the color layer 4 are successively disposed on the planar support 10 as described with reference to FIG. 13 or FIG. 8 but in an area sufficient to cover the entire surface of the substrate of the end magnetic card to obtain a first laminate.

Figure 16:
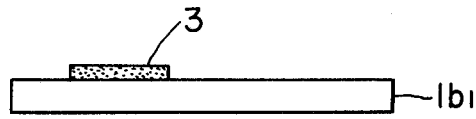

Separately, the magnetic layer 3 is provided at a desired portion of the over sheet $1b_1$ as shown in FIG. 16 to obtain a second laminate. The laminate shown in FIG. 16 is substantially the same as that shown in FIG. 11, and is obtained by a coating method or the heat transferring method set forth with reference to FIGS. 9 and 10.

Figure 17:
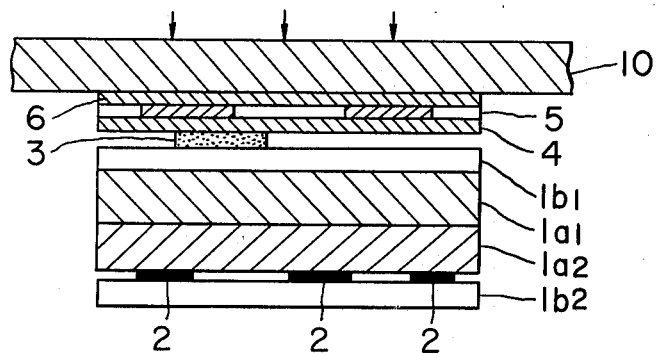

Then, a second over sheet $1b_2$ and a pair of core sheets $1a_1$ and $1a_2$ are prepared, and, as illustrated in FIG. 17, the second oversheet $1b_2$, the pair of core sheets $1a_1$ and $1a_2$, the second laminate, and the first laminate are successively stacked in laminated state. The entire structure is subjected to hot pressing to produce a bonded structure, and the planar support 10 is peeled off from the bonded structure, whereupon the magnetic structure shown in FIGS. 3 and 5 is obtained.

The third process is described above in relation to the magnetic card shown in FIGS. 3 and 5. However, the magnetic card shown in FIG. 7 can be obtained by providing the magnetic layer 3 over the entire surface of the over sheet $1b_1$. Also the magnetic card shown in FIGS. 4 and 6 can be obtained by providing the color layer 4 and other additional layers at the same portion and in the same area as those of the magnetic layer.

While the three processes set forth hereinabove are typical, some other processes may also be employed to produce the magnetic card of the present invention.

Figure 18:
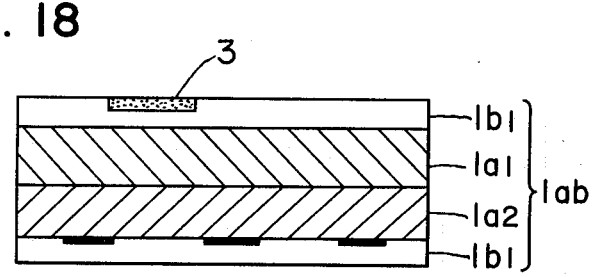

For example, it is possible to first obtain an intermediate structure wherein the magnetic layer 3 is embedded in the substrate $1_{ab}$ as shown in FIG. 18 by hot pressing at an intermediate stage, and to provide thereon the color layer 4 and other additional layers successively by coating or printing, or, more preferably, to dispose these additional layers on the planar support 10 as shown in FIG. 15 to obtain a laminate which is then placed on the above described intermediate structure in the manner described with reference to FIG. 17 and subject the stacked structure simultaneously to heat transferring and hot pressing.

It is also possible, though not particularly advantageous, to provide only the color layer 4 before the formation of the magnetic layer 3 in FIG. 9. These modifications may be easily achieved by those skilled in the art on the basis of the three processes described above.

In any of the foregoing processes, because of the characteristic features of the thermoplastic resin constituting at least the surface layer of the substrate $1_{ab}$ and because of the hot pressing step, increased bonding strength can be obtained whether the magnetic layer 3 is provided at a part of the substrate, in which case the magnetic layer is embedded in the substrate, or whether it is over entire surface thereof, and, further, a magnetic card having a smooth surface can be obtained.

The magnetic card thus produced has advantageous features in that the magnetic layer 3 is effectively hidden under the color layer 4 and in that the pattern layer appears clear. It is true, however, that an increased thickness of the color layer and other additional layers disposed on the magnetic layer will increase the gap between the magnetic layer and the magnetic head, resulting in an inferior electromagnetic conversion characteristic. It is thus preferable that the thicknesses of the color layer and the pattern layer 5 be as small as possible.

Figure 19:
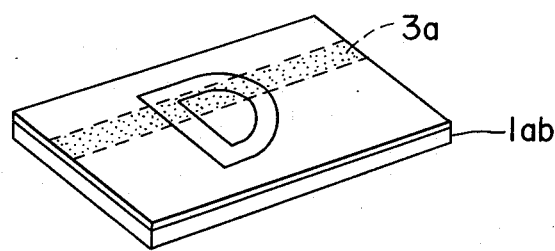
FIG. 19 is a perspective view of one example of the magnetic card according to the present invention.

However, if the total thickness of the color and pattern layers is reduced to from several $\mu m$ to about 10 $\mu m$, the magnetic layer 3 is likely to appear dark through the color and pattern layers as indicated by $3a$ in FIG. 19 in the case of a magnetic card as shown in FIGS. 3 and 5 wherein a magnetic layer 3 is provided at a part of a substrate, and additional layers such as a color layer 4 are provided over the entire surface thereof depending upon the design and color tone desired of the colored pattern. This is likely to spoil the harmony with the remaining area of the substrate in which no magnetic layer is embedded, with respect to the surface color pattern of the magnetic card.

We have found that such disharmony due to the magnetic layer 3 seen through the other layers thereover is caused by using a substrate $1_{ab}$, particularly core sheets $1a_1$ and $1a_2$, of white color and can be prevented by coloring the substrate $1_{ab}$ so that it appear to have a color tone similar to that of the magnetic layer 3 when the substrate is viewed from the side of the magnetic layer 3 or the side of the oversheet $1b_1$ in which the magnetic layer 3 is to be embedded.

Figure 20:
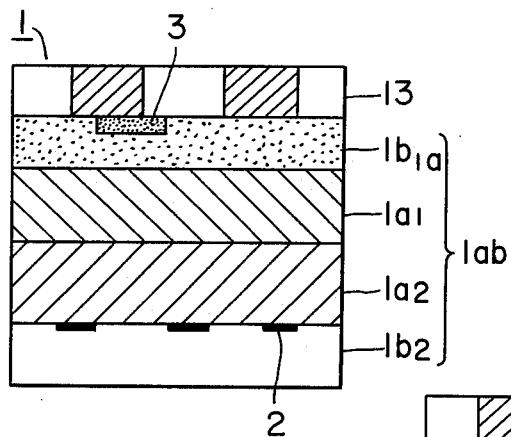
FIGS. 20 through 23 are sectional views respectively of other examples of the magnetic card according to the present invention.
Figure 21:
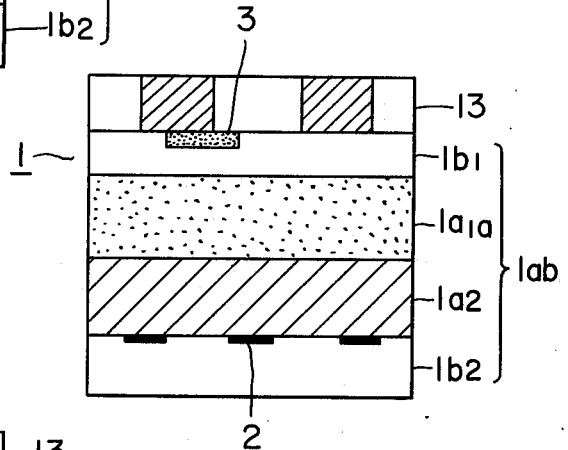
Figure 22:
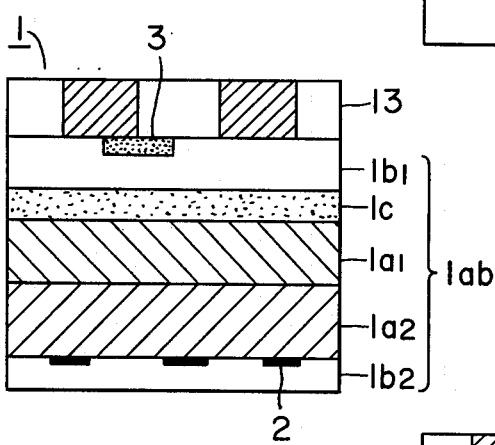
Figure 23:
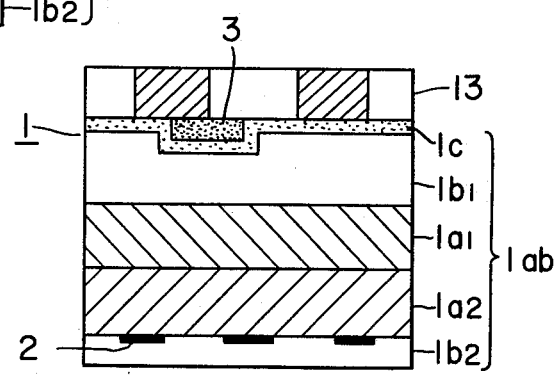

FIGS. 20 through 23 are sectional views respectively corresponding to FIG. 5 and showing examples of the magnetic card wherein the substrate $1_{ab}$ is colored in a manner as described above. In these figures, the color layer 4, the pattern layer 5, and the protective layer 6 are collectively represented by a layer 13 for convenience. More particularly, FIG. 20 shows an example wherein the over sheet $1b_{1a}$ constituting the surface layer of the substrate is colored; FIG. 21 shows an example wherein the over sheet $1b_1$ is transparent and the core sheet $1a_{1a}$ is colored; FIG. 22 illustrates an example wherein the over sheet $1b_1$ is transparent and a colored resin layer $1c$ is interposed between the over sheet $1b_1$ and the core sheet $1a_1$; and FIG. 23 shows an example wherein a colored resin layer $1c$ is disposed on the over sheet $1b_1$. The term "colored" herein means "colored in a tone similar to that of the magnetic layer 3". Examples of the color are typically black through brown since the magnetic layer 3 is ordinarily brown or dark brown, but also include a color such as blue or dark blue which, being substantially the same as brown or dark brown in brightness, looks substantially the same as the color of the magnetic layer through the color layer 4 and other additional layers. Such colors can be obtained by blending with a resin a pigment or dye of a desired color tone which is well known to those skilled in the art.

The magnetic cards shown in FIGS. 20 and 21 are produced by exactly the same process as described above. It will be readily understood that the same process is also substantially applicable to the magnetic cards shown in FIGS. 22 and 23 with the modification or providing one extra layer $1c$ in the substrate $1_{ab}$.

As set forth hereinabove, it is possible according to the present invention, which is characterised by hiding under a color layer the color of a magnetic layer which does not ordinarily contribute to the attractive appearance and disposing thereon a pattern layer, to obtain a magnetic card improved in both design and appearance with a pattern which is not subject to limitation by the color of the magnetic layer and appears clear due to the presence of the color layer.

We claim:
1. A magnetic card comprising:
   (1) a planar substrate having at least a surface layer of a thermoplastic resin;
   (2) a magnetic layer disposed at at least one part of a surface of the planar substrate;
   (3) a color layer disposed on the magnetic layer; and
   (4) a pattern layer disposed on the color layer.
2. A magnetic card as claimed in claim 1 which further comprises a protective resin layer disposed on the pattern layer.

3. A magnetic card as claimed in claim 1 wherein the magnetic layer is disposed at a part of a surface of the substrate.

4. A magnetic card as claimed in claim 2 wherein the magnetic layer, color layer, pattern layer, and protective resin layer are successively disposed and embedded at a part of the substrate so that the surface of the protective layer lies in the same plane as the surface of the substrate.

5. A magnetic card as claimed in claim 3 wherein the color layer and the pattern layer are disposed over the entire surface of the substrate.

6. A magnetic card as claimed in claim 5 wherein the magnetic layer is embedded in the substrate.

7. A magnetic card as claimed in claim 1 wherein the magnetic layer, the color layer, and the pattern layer are disposed over the entire surface of the substrate.

8. A magnetic card as claimed in claim 1 wherein the substrate has a laminar structure comprising a pair of opaque core sheets which are bonded to each other and a pair of over sheets respectively provided on the outer surfaces of the bonded core sheets.

9. A magnetic card as claimed in claim 8 wherein the over sheets are transparent.

10. A magnetic card as claimed in claim 5 wherein the substrate has a color tone similar to that of the magnetic layer when viewed from the side of the magnetic layer.

11. A magnetic card as claimed in claim 10 wherein the substrate has a laminar structure comprising a pair of opaque core sheets which are bonded to each other and a pair of over sheets respectively provided on the outer surfaces of the bonded core sheets.

12. A magnetic card as claimed in claim 11 wherein the over sheets are transparent and the core sheet which is nearer to the magnetic layer has a color tone similar to that of the magnetic layer.

13. A magnetic card as claimed in claim 11 wherein the over sheet which is nearer to the magnetic layer has a color tone similar to that of the magnetic layer.

14. A magnetic card as claimed in claim 11 wherein the over sheets are transparent and the substrate comprises a colored resin layer interposed between the over sheet which is nearer to the magnetic layer and the core sheets, said resin layer having a color tone similar to that of the magnetic layer.

15. A magnetic card as claimed in claim 11 wherein the substrate further comprises a colored resin layer on the over sheet which is nearer to the magnetic layer, said resin layer having a color tone similar to that of the magnetic layer.

16. A magnetic card as claimed in claim 1 wherein: the magnetic layer has a thickness of from 5 to 20 $\mu$m; the color layer has a thickness of from 2 to 15 $\mu$m; and the pattern layer has a thickness of from 1 to 10 $\mu$m.

17. A magnetic card as claimed in claim 2 wherein the protective resin layer has a thickness of from 0.5 to 3 $\mu$m.

18. A magnetic card as claimed in claim 9 which comprises a print pattern between the over sheet which is farther from the magnetic layer and the core sheet.

19. A process for producing a magnetic card which comprises:
(1) disposing successively at at least one part of a first over sheet a magnetic layer comprising a magnetic material powder and a binder of a natural or synthetic resin, a color layer, a pattern layer, and a protective resin layer to obtain a first laminate, and
(2) providing a second over sheet, sandwiching a pair of core sheets between the second over sheet and the first over sheet of the first laminate, and heating under pressure the entire structure thus prepared to obtain a magnetic card.

20. A process as claimed in claim 19 wherein the magnetic layer is disposed on a part of the first over sheet in step (1), and the magnetic layer is embedded in the over sheet of the end magnetic card.

21. A process for producing a magnetic card which comprises:
(1) disposing successively at at least one part of a planar support a protective resin layer, a pattern layer, a color layer, and a magnetic layer comprising a magnetic material powder and a binder of a thermoplastic resin to obtain a first laminate,
(2) placing the magnetic layer of the first laminate in contact with a first over sheet of a thermoplastic resin, bonding the first laminate to the first over sheet by heating under pressure, and peeling off the planar support from the bonded structure thus obtained to leave a second laminate, and
(3) providing a second over sheet, sandwiching a pair of core sheets between the second over sheet and the first over sheet of the second laminate, and heating under pressure the entire structure thus prepared to obtain a magnetic card.

22. A process as claimed in claim 21 wherein the magnetic layer is placed in contact with a part of the first over sheet in step (2), and the magnetic layer is embedded in the first over sheet of the end magnetic card.

23. A process for producing a magnetic card which comprises:
(1) disposing successively at at least one part of a planar support a protective resin layer, a pattern layer, and a color layer to obtain a first laminate;
(2) placing at at least one part of a first over sheet of a thermoplastic resin a magnetic layer comprising a magnetic material powder and a binder of a thermoplastic resin to obtain a second laminate;
(3) providing a second over sheet and a pair of core sheets, disposing successively in laminated stete the second over sheet, the pair of core sheets, the second laminate, and the first laminate in the order named, the first over sheet of the second laminate being placed in contact with one of the core sheets, the magnetic layer of the second laminate being in contact with the color layer of the first laminate, and heating under pressure the entire structure thus prepared to obtain a bonded structure; and
(4) peeling off the planar support from the bonded structure thus prepared to obtain a magnetic card.

* * * * *

UNITED STATES PATENT OFFICE
CERTIFICATE OF CORRECTION

Patent No. 4,132,350                    Dated   January 2, 1979

Inventor(s) Tetsuo Kubota et al.

It is certified that error appears in the above-identified patent and that said Letters Patent are hereby corrected as shown below:

Col. 3, line 30, change "lb;hd2" to --$lb_2$--.

Col. 3, line 56, after "copolymer" insert --,--.

Col. 5, line 23, after "pattern" insert --layer--.

Col. 8, line 47, change "or" to --of--.

Signed and Sealed this

Eighth Day of May 1979

[SEAL]

Attest:

RUTH C. MASON
Attesting Officer

DONALD W. BANNER
Commissioner of Patents and Trademarks